United States Patent
Slanker et al.

(10) Patent No.: US 9,662,936 B2
(45) Date of Patent: May 30, 2017

(54) THREADED SIDE RIM OR THREADED LOCK RING WHEEL FOR USE WITH LOW-PRESSURE OR NON-PNEUMATIC TIRES

(71) Applicants: Andrew Joseph Slanker, Fairborn, OH (US); Scottie Gene Whittle, Springboro, OH (US)

(72) Inventors: Andrew Joseph Slanker, Fairborn, OH (US); Scottie Gene Whittle, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 792 days.

(21) Appl. No.: 13/711,730

(22) Filed: Dec. 12, 2012

(65) Prior Publication Data

US 2014/0158265 A1    Jun. 12, 2014

(51) Int. Cl.
| | | |
|---|---|---|
| *B60B 25/10* | (2006.01) | |
| *B64C 25/36* | (2006.01) | |
| *B60B 25/08* | (2006.01) | |
| *B60B 25/12* | (2006.01) | |
| *B60B 25/14* | (2006.01) | |

(52) U.S. Cl.
CPC ............. *B60B 25/10* (2013.01); *B60B 25/08* (2013.01); *B64C 25/36* (2013.01); *B60B 25/12* (2013.01); *B60B 25/14* (2013.01); *B60B 2900/212* (2013.01); *B60B 2900/325* (2013.01); *Y10T 29/49494* (2015.01)

(58) Field of Classification Search
CPC ......... B60B 25/04; B60B 25/10; B60B 25/14; B60B 21/00; B60B 21/02; B60B 21/125
USPC ......... 152/381.4, 379.3, 398, 396, 397, 385, 152/410, 409, 405, 402
See application file for complete search history.

(56) References Cited

U.S. PATENT DOCUMENTS

| | | | | |
|---|---|---|---|---|
| 1,493,040 | A * | 5/1924 | Klaus ............................ | 152/410 |
| 2,478,580 | A * | 8/1949 | Hollerith ...................... | 152/406 |
| 2,817,383 | A * | 12/1957 | Lafaye ......................... | 152/409 |
| 2,884,984 | A * | 5/1959 | Riggs ............................ | 152/410 |
| 4,116,489 | A * | 9/1978 | Walther ........................ | 301/12.1 |
| 4,235,275 | A * | 11/1980 | Sons, Jr. ....................... | 152/410 |
| 4,438,797 | A * | 3/1984 | Suckow ........................ | 152/410 |
| 4,706,723 | A * | 11/1987 | Loeber et al. ................ | 152/410 |
| 5,240,055 | A * | 8/1993 | Smith ........................... | 152/409 |
| 6,311,749 | B1 * | 11/2001 | Taylor .......................... | 152/410 |
| 8,020,943 | B2 | 9/2011 | Kipp et al. | |

(Continued)

FOREIGN PATENT DOCUMENTS

| | | | | |
|---|---|---|---|---|
| EP | 1632363 A1 | 3/2006 | | |
| GB | 002354983 A * | 4/2001 | ............. | B60B 25/14 |
| GB | 2354983 A | 4/2001 | | |

(Continued)

OTHER PUBLICATIONS

EP Search Report; Application No. 13196947.9; Date of Mailing: Jan. 4, 2014; pp. 1-7.

*Primary Examiner* — Jason Bellinger
(74) *Attorney, Agent, or Firm* — Cantor Colburn LLP

(57) ABSTRACT

A method of coupling a tire to a wheel is disclosed. A bead of the tire is placed against a side rim that is movable with respect to the wheel base. The side rim is moved along the axis of the wheel base and against the tire bead to couple the tire to the wheel.

9 Claims, 4 Drawing Sheets

(56) References Cited

U.S. PATENT DOCUMENTS

2002/0149256 A1* 10/2002 McNeil et al. .......... 301/35.628

FOREIGN PATENT DOCUMENTS

| | | |
|---|---|---|
| JP | S568701 A | 1/1981 |
| JP | S58110501 U | 7/1983 |
| WO | WO 2007041490 A1 * 4/2007 | ............. B60B 25/14 |

* cited by examiner

THREADED SIDE RIM OR THREADED LOCK RING WHEEL FOR USE WITH LOW-PRESSURE OR NON-PNEUMATIC TIRES

BACKGROUND

The present disclosure relates to aircraft wheel assemblies, and more specifically, to an aircraft wheel assembly for affixing a non-pneumatic or low pressure tire.

A lock-ring aircraft wheel assembly generally includes a wheel base, a side rim attached to the wheel base, and a tire that is affixed to the wheel via a frictional force between the tire and the wheel flanges on both the side rim and wheel base. In order to apply the frictional force that holds the tire in place with respect to the wheel base, the tire is placed in position on the wheel base and the wheel is assembled with the side rim. As the tire is filled with air, pressure increases inside the tire, and the walls of the tire expand outward against the flanges, applying an outward force to the side rim. The side rim resists the outward force, thereby creating an interface having a strong frictional component or force. This frictional force between the beads of the tire and the wheel flanges makes the tire suitable for its various operations, i.e., acceleration, braking, etc. and prevents slippage between the tire and the side rim during these operations. Non-pneumatic tires do not employ an inflation pressure and therefore do not expand. Such non-pneumatic tires are therefore unable to express an outward force against stationary wheel flanges. Therefore, current methods are unsuitable for securing non-pneumatic tires or tires employing low inflation pressures.

SUMMARY

According to one embodiment of the present disclosure, a method of coupling a tire to a wheel includes: placing a bead of the tire against a side rim movable with respect to the wheel base; and moving the side rim against the tire bead to couple the tire to the wheel.

According to another embodiment, a wheel assembly includes: a wheel base; a tire; and a side rim movable with respect to the wheel base and configured to move against a bead of the tire to couple the tire to the wheel.

According to another embodiment, a method of coupling a tire to a wheel includes: seating a bead of the tire at a bead seat of a side rim movably coupled to the wheel base; and moving a threaded component relative to the wheel base to move the side rim against the bead to the tire to create a coupling force between the tire bead and the side rim.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
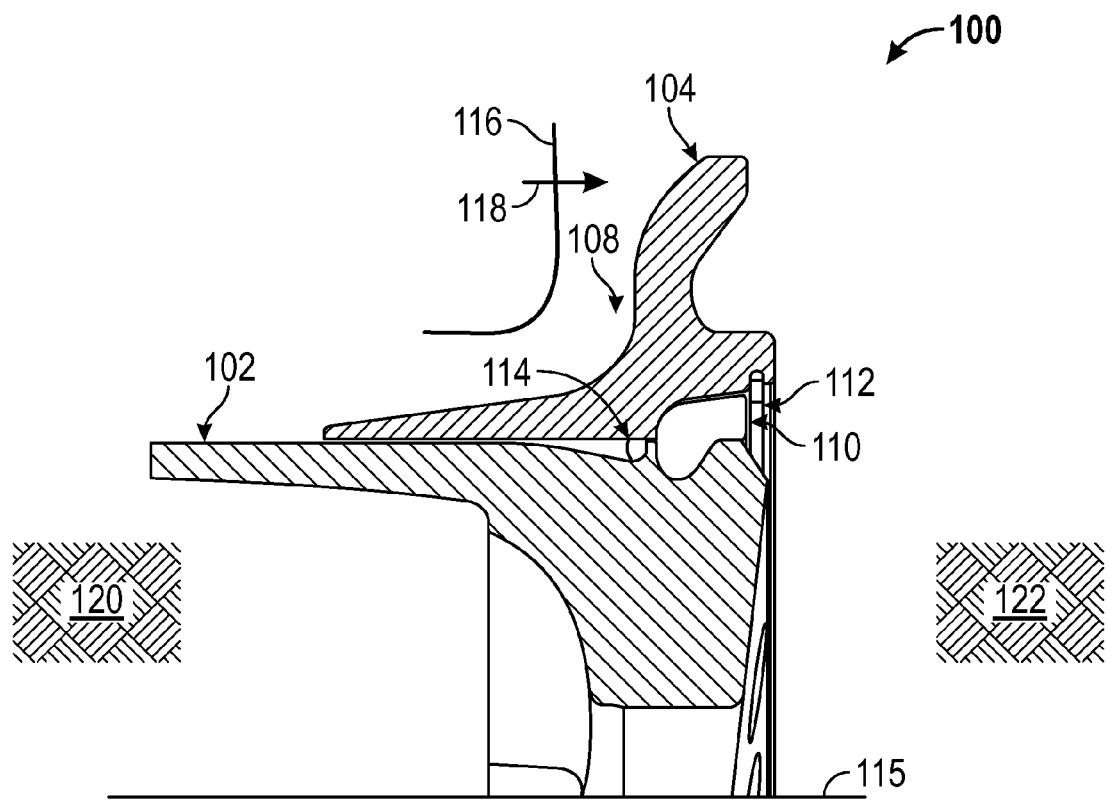
FIG. 1 shows a cross-sectional view of a wheel assembly for use in securing pneumatic tires.

FIG. 1 shows a cross-sectional view of a wheel assembly 100 for use in securing pneumatic tires according to the prior art. FIG. 1 shows only a top half of the wheel assembly 100 with respect to a wheel axis 115. FIGS. 2-7 show similar top halves of wheel assemblies. The wheel assembly 100 is axisymmetric about the wheel axis 115. The assembly 100 includes a wheel base 102 that may be attached to a vehicle at an inboard location 120. A side rim 104 is movably coupled to the wheel base 102 so as to be movable along an axial direction of the wheel base 102. In order to affix the tire to the wheel assembly 100, the wheel base is first inserted into the tire, such that the tire bead contacts the bead seats on the wheel base flange (not shown). Then, the side rim is assembled onto the wheel base, such that the other bead 116 of the tire is placed against the bead seat 108 of the side rim 104 and air is pumped into the tire. As the tire is inflated, the tire expands to move the tire bead 116 axially outward, i.e., towards an outboard location 122, as shown by directional arrow 118. The expanding tire therefore pushes the side rim 104 against a lock ring 110. At this point, further expansion of the tire compresses the tire bead 116 against the side rim 104 to create a frictional force that holds the tire in place and enables the tire to be capable of braking, acceleration and other torques without slippage between the tire and the side rim 104 and without air leaking from between the tire and the side rim 104. Retaining ring 112 prevents inward motion of the side rime and/or loss of the lock ring in case of a loss of inflation pressure. A preformed packing 114 is included between the side rim 104 and the wheel base to prevent air leakage.

Non-pneumatic tires or low-pressure tires do not provide a large enough axially outward force of the tire bead 116 against the side rim 104 to sufficiently secure the tires to the wheel base 102. For such tires, the wheel assembly 100 is unable to withstand various forces and torques expected during operation of the wheel assembly 100, such as reacting to braking torque or resisting relative movement of wheel halves during rolling. Additionally, when using the wheel assembly 100 with a non-pneumatic tire, wear at the tire-wheel interfaces and dimensional tolerances make it difficult for the wheel assembly 100 to maintain adequate compressive force and torque capacity. The present disclosure therefore provides a wheel assembly and method of coupling a tire to the wheel assembly that is suitable for use with low-pressure, or non-pneumatic tires and is tolerant of wear and manufacturing variations.

Figure 2:
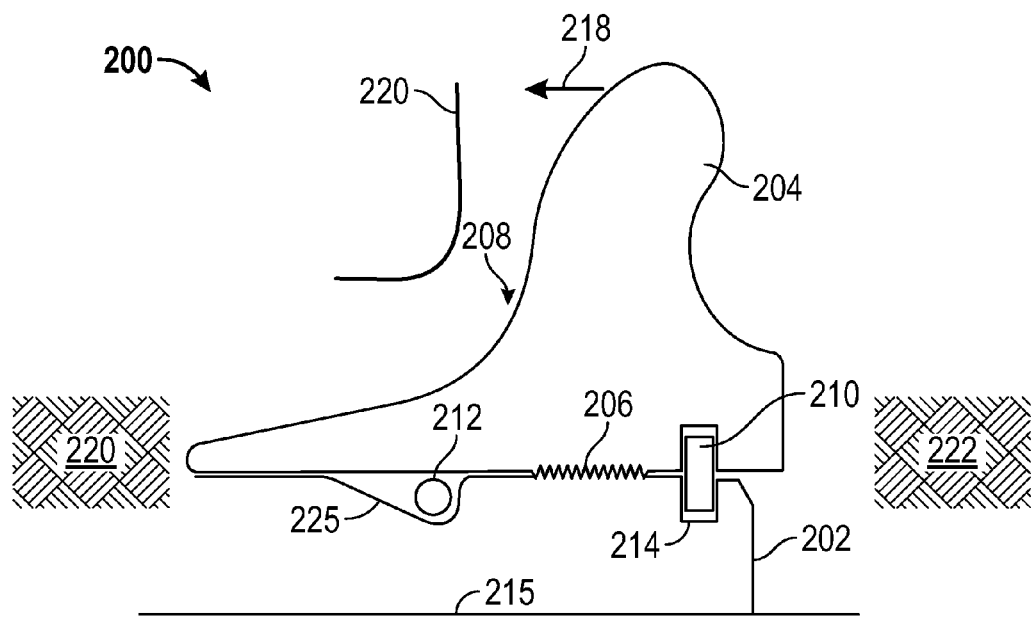
FIG. 2 shows a cross-sectional view of an exemplary wheel assembly suitable for coupling a non-pneumatic or low-pressure tire.

FIG. 2 shows a cross-sectional view of an exemplary wheel assembly 200 suitable for coupling a non-pneumatic or low-pressure tire to a wheel. The wheel assembly 200 includes a wheel base 202 that is substantially axisymmetric about a wheel axis 215. The wheel base 202 may be coupled to a vehicle at an inboard location 220 of the wheel base 202.

A side rim 204 is movably coupled to the wheel base 202 and is movable along an axial direction of the wheel base 202. Relative motion of the side rim 204 to the wheel base may be made possible via a screw thread 206 or other threaded coupling between the side rim 204 and the wheel base 202. In one embodiment, the side rim 204 and wheel base 202 may be threaded so that the side rim 204 may advance past the threads themselves and slide onto the wheel base 202, unless constrained by another feature. In alternate embodiments, other coupling devices between side rim 204 and wheel base 202 may be used to enable axial motion between the side rim 204 and the wheel base 202.

To couple the tire to the wheel base 202, a bead 220 of the tire is seated at a bead seat 208 of the side rim 204. The side rim 204 is then moved along the axis of the wheel base 202 inward, i.e., towards an inboard location, as shown by the directional arrow 218. This inward axial motion of the side rim 204 against the tire bead 220 creates a compressive force exerted by the side rim 204 on the tire bead 220 to provide a sufficient frictional force or coupling force against the tire bead 220 of the non-pneumatic tire so that the coupling between the non-pneumatic tire to the wheel assembly is able to withstand the various forces and torques that are expected to be encountered during use. An O-ring or seal 212, which is generally for use with low-pressure tires, may be disposed in a cavity 225 formed in the wheel base. The side rim 204 moves over the cavity 225 to form a seal using the O-ring 212 that prevents air leakage between the side rim 204 and the wheel base 202.

In an exemplary embodiment, a lock ring 210 is inserted in a slot 214 in order to hold the side rim 204 in place with respect to the wheel base 202 once the side rim 204 is at a suitable axial location. In contrast to the lock ring 110 of the wheel assembly 100 which is used to prevent flange separation, the lock ring 210 is used to prevent or resist unscrewing of the side rim 210 or axially outward motion of the side rim 204. In an exemplary embodiment, the lock ring 210 may be installed by feeding the lock ring 210 into the slot 214 at a wide section in the slot 214. In various embodiments, a spiral ring may be used to prevent the lock ring 210 from working out of the slot.

Figure 3:
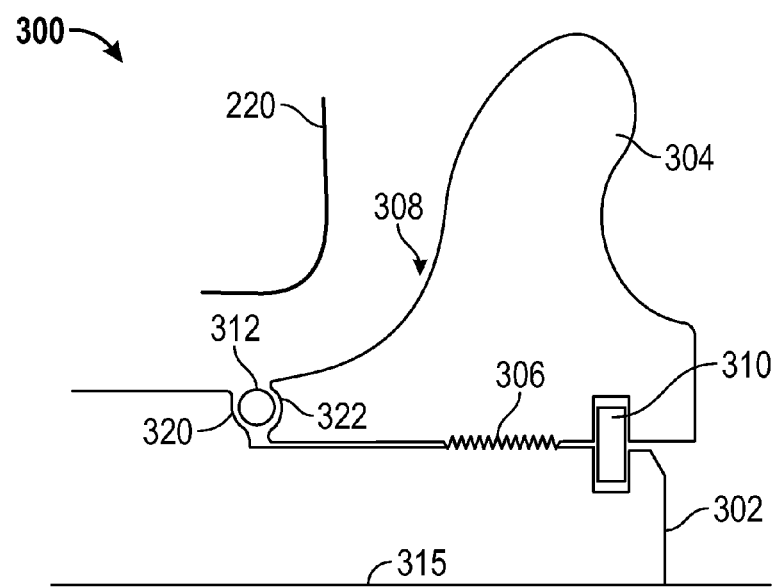
FIG. 3 shows a cross-sectional view of a wheel assembly in an alternate embodiment.

FIG. 3 shows a cross-sectional view of a wheel assembly 300 in an alternate embodiment. The exemplary wheel assembly 300 includes a wheel base 302 that is substantially axisymmetric about a wheel axis 315. The wheel base 302 includes a recessed portion. A side rim 304 is movable along an axial direction of the wheel base 302 in the recessed portion. Relative motion of the side rim 304 with respect to the wheel base 302 may be made possible via a screw thread 306 or other threaded coupling between the side rim 304 and the wheel base 302 in the recessed portion. In alternate embodiments, any other coupling between side rim 304 and wheel base 302 that allows the side rim 304 to move along the axis of the wheel base 302 in the recessed portion may be suitable.

The tire is coupled to the wheel base 302 by seating a tire bead 320 at a bead seat 308 of the side rim 304 and moving the side rim 304 axially inward against the tire bead 320 to increase a compressive force exerted by the side rim 304 against the tire bead 320. Lock ring 310 may be used to hold the side rim 304 in place with respect to the wheel base 302 when the tire is considered secured to the wheel base 302. The lock ring 310 is used to resist unscrewing of the side rim 304.

The recessed portion of the wheel base 302 defines a wheel base wall 320. The side rim has a side rim wall 322 that is opposed to wheel base wall 320 during installation. Inward motion of the side rim 304 moves the side rim wall 322 towards the wheel base wall 320. A seal or O-ring 312, generally for use in low-pressure tires, may be disposed between the wheel base wall 320 and the side rim wall 322. When the side rim 304 is moved inward, the O-ring 312 is compressed to form a seal.

Figure 4:
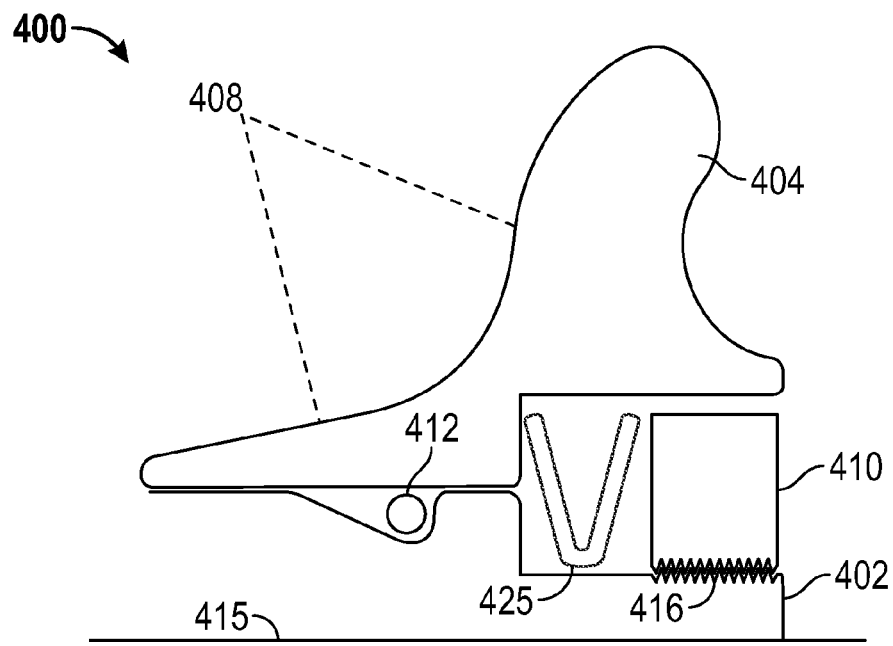
FIG. 4 shows a cross-sectional view of a wheel assembly in another alternate embodiment.

FIG. 4 shows a cross-sectional view of a wheel assembly 400 in another alternate embodiment. The wheel base assembly 400 includes a wheel base 402 that is substantially symmetric about a wheel axis 415 and may be attached to a vehicle at an inboard location. A side rim 404 is coupled to the wheel base 402 and is movable along an axial direction of the wheel base 402. Lock ring 410 is coupled by threads to the wheel base 402. The lock ring 410 may be coupled to the wheel base 402 in a recessed portion of the wheel base 402 and is configured to move relative to the wheel base 402 via a screw thread 406 or other threaded coupling between the lock ring 410 and the wheel base 402. The lock ring 410 may be rotated about the wheel base 402 to produce an inward motion to compress the side rim 404 against a tire bead located at the bead set 408. Threaded coupling of the lock ring 410 to the wheel base 402, rather than threaded coupling between the side rim and wheel base as shown in FIGS. 2 and 3, allow the side rim 404 to move axially without rotation. This reduces tangential stress components during installation and use of the wheel assembly 400. To aid in rotation, drive features may be incorporated in the side rim or lock ring.

In one embodiment, the lock ring 410 is placed in direct contact with the side rim 404 during installation. Alternatively, a flexible element 425 may be disposed in a region between the lock ring 410 and the side rim 404. The flexible element 425 may be configured to allow for thermal expansion, component tolerances, etc. Thus, inward motion of the lock ring 410 is transmitted to the side rim 404 via the flexible element 425. O-ring 412 is disposed between wheel base 402 and side rim 412 to prevent air leakage.

Figure 5:
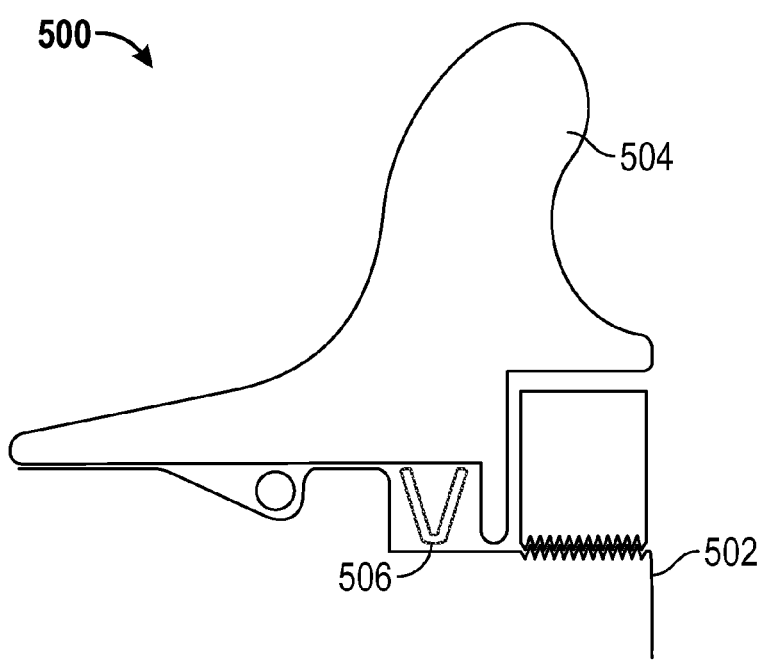
FIGS. 5-7 show various additional alternate embodiments of wheel assemblies that operate according to the securing methods disclosed herein.
Figure 6:
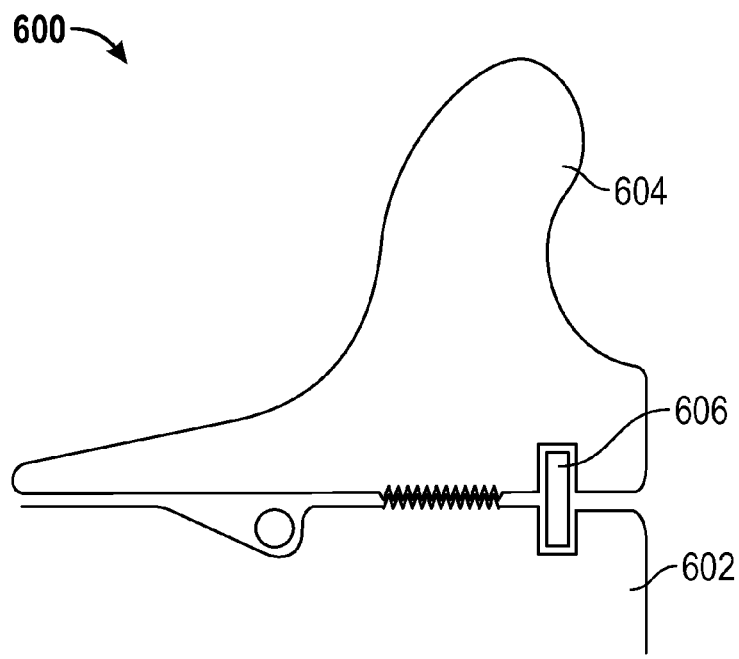
Figure 7:
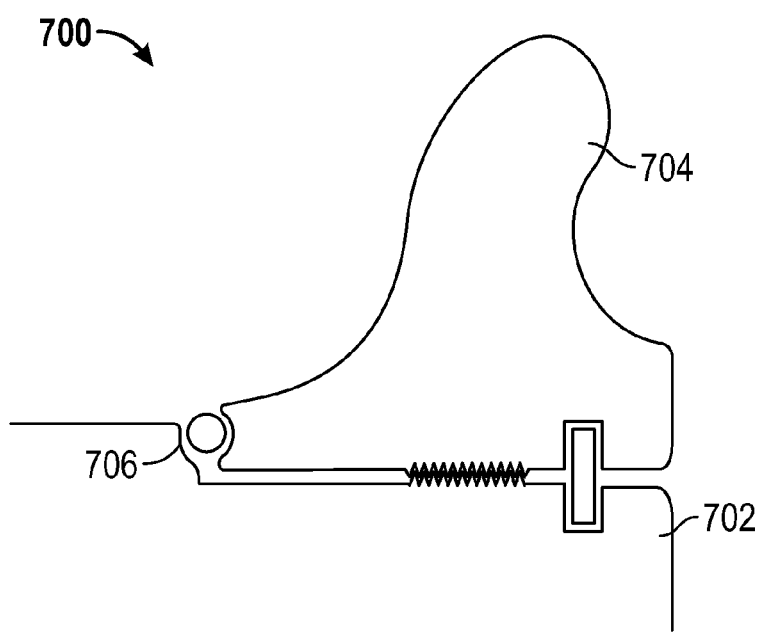

Various additional alternate embodiments of wheel assemblies that operate according to the securing methods disclosed herein are shown in FIGS. 5-7. FIG. 5 shows a wheel assembly 500 similar to the wheel assembly 400 of FIG. 4 in which the flexible element 506 is disposed between the side rim 504 and the wheel base 502. FIG. 6 shows wheel assembly 600 similar to wheel assembly 200 of FIG. 2 and includes an anti-rotation feature 606 disposed between the side rim 604 and the wheel base 602 (in place of the lock ring 210 of FIG. 2). The anti-rotation feature 606 may take the form of castellations in the wheel base and through holes in the side rim that admit a set screw or shear pin. Anti-rotation features may be combined with drive features used to turn the rotating element. Alternatively, a lock ring may be installed to retain the side rim 604 once the side rim is threaded past an appropriate position on the wheel base 602. In various embodiments, the anti-rotation device 606 may be fully outboard of the side rim 604 or outboard of at least some part of the side rim 604. FIG. 7 shows an assembly 700 similar to the wheel assembly 600 of FIG. 6 and includes side rim 704 moving in a recess of the wheel base 702. The side rim 704 moves against a wall 706 of the recess of the wheel base 702 during tire installation.

The embodiments shown herein with respect to FIGS. 2-7 may also employ a side rim that is castellated or non-circular. Such a side rim may be used as an anti-rotation feature, similar to the use of locking nuts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. For the purposes of this disclosure, it is further understood that the terms "inboard" and "outboard" can be used interchangeably, unless context dictates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A method of coupling a tire to a wheel, comprising:
    seating a bead of the tire on a bead seat of a side rim that is movable with respect to a wheel base;
    moving the side rim inwardly along a wheel axis of the wheel base against the tire bead to exert a compressive force on the tire bead in order to couple the tire to the wheel base after the bead has been set; and
    inserting a lock ring to lock the side ring into a fixed position.

2. The method of claim 1, wherein the compressive force between the side rim and the tire bead is resistive to at least one of a braking force and an acceleration force during operation of the wheel.

3. The method of claim 1 further comprising moving the side rim using a threaded coupling between the side rim and the wheel base.

4. The method of claim 1 further comprising placing an O-ring within a recessed portion of the wheel base and the side rim and moving the side rim against the O-ring and a wall of the wheel base to form a seal.

5. The method of claim 1, wherein the side rim has a non-circular cross-section.

6. The method of claim 1, wherein the tire is one of: a non-pneumatic tire; a low-pressure tire; and a tire that lacks a substantially expansive force for affixing the tire to the wheel.

7. The method of claim 1 further comprising securing the side rim at an axial location of the wheel base when the tire is coupled to the wheel.

8. A method of coupling a tire to a wheel, comprising:
    seating a bead of the tire at a bead seat of a side rim that is movably coupled to the wheel base using a threaded coupling; and
    moving the side rim inwardly along a wheel axis of the wheel base against the bead of the tire after the bead is set to exert a compressive force on the tire bead in order to create a coupling force between the tire bead and the side rim; and
    inserting a lock ring to lock the side ring into a fixed position.

9. The method of claim 8, further comprising holding the side rim in place using the lock ring.

\* \* \* \* \*